United States Patent
Levesque et al.

(10) Patent No.: US 9,639,158 B2
(45) Date of Patent: May 2, 2017

(54) SYSTEMS AND METHODS FOR GENERATING FRICTION AND VIBROTACTILE EFFECTS

(71) Applicant: IMMERSION CORPORATION, San Jose, CA (US)

(72) Inventors: Vincent Levesque, Montreal (CA); Ali Modarres, Mont-Royal (CA); Juan Manuel Cruz-Hernandez, Montreal (CA); Amaya Becvar Weddle, San Jose, CA (US); David M. Birnbaum, Oakland, CA (US); Danny A. Grant, Laval (CA)

(73) Assignee: Immersion Corporation, San Jose, CA (US)

( * ) Notice: Subject to any disclaimer, the term of this patent is extended or adjusted under 35 U.S.C. 154(b) by 3 days.

(21) Appl. No.: 14/090,922

(22) Filed: Nov. 26, 2013

(65) Prior Publication Data
US 2015/0145657 A1    May 28, 2015

(51) Int. Cl.
*G06F 3/01* (2006.01)
*G06F 3/041* (2006.01)
*G06F 3/0481* (2013.01)

(52) U.S. Cl.
CPC .............. *G06F 3/016* (2013.01); *G06F 3/041* (2013.01); *G06F 3/0481* (2013.01)

(58) Field of Classification Search
CPC ......... G06F 3/016; G06F 3/041; G06F 3/0481
See application file for complete search history.

(56) References Cited

U.S. PATENT DOCUMENTS

| 5,149,918 A | 9/1992 | Kozik et al. |
| 7,088,342 B2 | 8/2006 | Rekimoto et al. |
| 7,205,978 B2 | 4/2007 | Poupyrev et al. |

(Continued)

FOREIGN PATENT DOCUMENTS

| JP | H11203020 | 7/1999 |
| JP | 2010-5036579 | 2/2010 |

(Continued)

OTHER PUBLICATIONS

Smith, Ned, "Feel the future: Touch screens that touch back", MSNBC [online], [retrieved Apr. 21, 2011]. Retrieved from the internet <URL: http://www.msnbc.msn.com/clearprint/CleanPrintProxy.aspx?unique=1303408902146>.

(Continued)

*Primary Examiner* — Ryan A Lubit
(74) *Attorney, Agent, or Firm* — Kilpatrick Townsend & Stockton LLP (57) ABSTRACT

A system includes a sensor configured to sense an input received from a user at a surface; a first haptic output device configured to generate a first haptic effect at the surface based on the input received from the user, the first haptic effect comprising a friction effect at the surface; a second haptic output device configured to generate a second haptic effect, the second haptic effect comprising vibrotactile feedback; and a processor configured to receive an input signal from the sensor and output a first drive signal to the first haptic output device to generate the first haptic effect and to output a second drive signal to the second haptic output device to generate the second haptic effect.

37 Claims, 8 Drawing Sheets

(56) References Cited

U.S. PATENT DOCUMENTS

| | | |
|---|---|---|
| 7,446,456 B2 | 11/2008 | Maruyama et al. |
| 7,456,823 B2 | 11/2008 | Poupyrev et al. |
| 7,522,152 B2 | 4/2009 | Olien et al. |
| 7,554,246 B2 | 6/2009 | Maruyama et al. |
| 7,663,604 B2 | 2/2010 | Maruyama et al. |
| 7,755,607 B2 | 7/2010 | Poupyrev et al. |
| 8,749,495 B2 | 6/2014 | Grant et al. |
| 8,902,050 B2 | 12/2014 | Heubel et al. |
| 9,196,134 B2 | 11/2015 | Levesque |
| 2005/0017947 A1 | 1/2005 | Shahoian et al. |
| 2005/0057528 A1 | 3/2005 | Kleen |
| 2005/0134561 A1* | 6/2005 | Tierling ............... G06F 3/016 345/156 |
| 2005/0275967 A1 | 12/2005 | Olien et al. |
| 2006/0103634 A1 | 5/2006 | Kim et al. |
| 2006/0167576 A1 | 7/2006 | Rosenberg |
| 2006/0267944 A1 | 11/2006 | Rosenberg et al. |
| 2007/0118043 A1 | 5/2007 | Oliver et al. |
| 2007/0157089 A1 | 7/2007 | Van Os et al. |
| 2007/0236450 A1 | 10/2007 | Colgate et al. |
| 2008/0051919 A1 | 2/2008 | Sakai et al. |
| 2008/0068348 A1 | 3/2008 | Rosenberg et al. |
| 2008/0088580 A1 | 4/2008 | Poupyrev et al. |
| 2008/0097633 A1 | 4/2008 | Jochelson et al. |
| 2009/0079550 A1 | 3/2009 | Makinen et al. |
| 2009/0088877 A1 | 4/2009 | Terauchi et al. |
| 2009/0106655 A1 | 4/2009 | Grant et al. |
| 2009/0109007 A1 | 4/2009 | Makinen et al. |
| 2009/0251439 A1 | 10/2009 | Westerman et al. |
| 2009/0284485 A1 | 11/2009 | Colgate et al. |
| 2009/0313542 A1 | 12/2009 | Cruz-Hernandez et al. |
| 2010/0013761 A1 | 1/2010 | Birnbaum et al. |
| 2010/0060604 A1 | 3/2010 | Zwart et al. |
| 2010/0085169 A1 | 4/2010 | Poupyrev et al. |
| 2010/0085316 A1 | 4/2010 | Kim |
| 2010/0127819 A1 | 5/2010 | Radivojevic et al. |
| 2010/0231367 A1 | 9/2010 | Cruz-Hernandez et al. |
| 2010/0231539 A1 | 9/2010 | Cruz-Hernandez et al. |
| 2010/0231550 A1* | 9/2010 | Cruz-Hernandez ... G06F 3/0488 345/174 |
| 2011/0021272 A1* | 1/2011 | Grant .................. A63F 13/10 463/30 |
| 2011/0022594 A1 | 1/2011 | Takatsuka et al. |
| 2011/0093100 A1 | 4/2011 | Ramsay |
| 2011/0163946 A1* | 7/2011 | Tartz ................... G06F 3/016 345/156 |
| 2012/0268412 A1 | 10/2012 | Cruz-Hernandez et al. |
| 2012/0276956 A1* | 11/2012 | Tanioka ............... H04M 19/047 455/566 |
| 2013/0222280 A1* | 8/2013 | Sheynblat et al. ............ 345/173 |
| 2014/0082489 A1* | 3/2014 | Park ................... G06F 3/0488 715/702 |
| 2014/0118127 A1 | 5/2014 | Levesque et al. |
| 2015/0097786 A1* | 4/2015 | Behles ................. G06F 3/041 345/173 |

FOREIGN PATENT DOCUMENTS

| | | |
|---|---|---|
| WO | WO 2009/037379 | 3/2009 |
| WO | WO 2009/141502 | 11/2009 |

OTHER PUBLICATIONS

Greene, Kate, "A Touch Screen with Texture", Technology Review [online], [retrieved Apr. 21, 2011]. Retrieved from the Internet <URL: http://www.technologyreview.com/printer_friendly_article.aspx?id=26506>.

Bonderud, Doug, "Nokia Files Patent to Make Phones Digitally Stimulating", InventorSpot.com [online], [retrieved Apr. 21, 2011]. Retrieved from the Internet <URL: http://inventorspot.com/articles/nokia_files_patent_make_phones-digitally-stimulating>.

Marks, Paul, "Nokia touchscreen creates texture illusion", New Scientist [online], [retrieved Apr. 21, 2011]. Retrieved from the Internet <URL: http://www.newscientist.com/article/dn19510-nokia-touchscreen-creates-texture-illusion.html>.

* cited by examiner

SYSTEMS AND METHODS FOR GENERATING FRICTION AND VIBROTACTILE EFFECTS

FIELD

The present invention is related to systems and methods for generating friction and vibrotactile effects.

BACKGROUND

User interfaces that include haptic displays may be configured to provide a haptic effect in the form of vibrotactile feedback to the user for confirmation that an action has been successfully executed or for notification that an action has taken place. For example, vibrotactile feedback may be provided as confirmation that a button displayed by a touch screen has been successfully pressed or when a text message or e-mail has been received by the user interface. User interfaces that include haptic displays may be configured to provide a haptic effect in the form of a friction effect when a finger or stylus slides against a surface of the haptic display. Haptic displays that are configured to generate friction effects do not provide feedback for notifications. It is desirable to have a user interface that uses both types of haptic displays so that additional types of haptic effects may be provided to the user, which may lead to a more compelling user experience.

SUMMARY

According to an aspect of the invention, there is provided a system that includes a sensor configured to sense an input received from a user at a surface, and a first haptic output device configured to generate a first haptic effect at the surface based on the input received from the user. The first haptic effect includes a friction effect at the surface. The system also includes a second haptic output device configured to generate a second haptic effect. The second haptic effect includes vibrotactile feedback. The system also includes a processor configured to receive an input signal from the sensor and output a first drive signal to the first haptic output device to generate the first haptic effect and to output a second drive signal to the second haptic output device to generate the second haptic effect.

In an embodiment, the first haptic output device includes an electrostatic device. In an embodiment, the first haptic output device includes an ultrasonic vibration device.

In an embodiment, the second haptic output device includes an actuator. In an embodiment, the actuator includes a piezoelectric actuator, a voice coil, a magnetic actuator, a pneumatic actuator, an ultrasonic energy actuator, an eccentric mass actuator, an electroactive polymer actuator, or a shape memory alloy.

In an embodiment, the system further includes a touch screen comprising the surface. In an embodiment, the touch screen includes a display configured to display an image.

In an embodiment, the system further includes an input device, and the first haptic effect is configured to provide orientation cues for use of the input device and the second haptic effect is associated with the image being displayed by the display.

According to an aspect of the invention, there is provided a method that includes sensing an input at a touch surface of a user interface by a user, and generating a first haptic effect at the touch surface in response to the sensed input. The first haptic effect includes a friction effect. The method also includes generating a second haptic effect in the user interface. The second haptic effect includes vibrotactile feedback.

In an embodiment, the method also includes displaying an image through the touch surface. In an embodiment, the method also includes displaying a second image at the same time the image is being displayed. The second haptic effect is associated with an interaction of the image being displayed with the second image being displayed.

In an embodiment, the first haptic effect is associated with the image being displayed by the display and the second haptic effect is associated with an event not associated with the image being displayed by the display. In an embodiment, the event is a notification.

In an embodiment, the first haptic effect is associated with movement of the image by the user.

In an embodiment, the second haptic effect is associated with an interaction of the image displayed by the display with an edge of the display. In an embodiment, the second haptic effect is associated with movement of the image without interaction by the user. In an embodiment, the second haptic effect is associated with an interaction of the image displayed by the display with a second image displayed by the display.

In an embodiment, the first haptic effect is associated with alteration of the image by the user from a first configuration to a second configuration, and the second haptic effect is associated with the image being held in the second configuration.

In an embodiment, the first haptic effect is generated when the user interacts with the image by sliding across the surface at a location of the image, and the second haptic effect is generated when the user interacts with the image by pressing against the surface at the location of the image.

In an embodiment, the first haptic effect and the second haptic effect are generated at substantially the same time. In an embodiment, the first haptic effect and the second haptic effect alternate over time. In an embodiment, the first haptic effect is generated for a first predetermined amount of time and then the second haptic effect is generated for a second predetermined amount of time.

In an embodiment, the second haptic effect is generated when the user hovers over the surface.

In an embodiment, the first haptic effect is generated in a first range of frequencies, and the second haptic effect is generated in a second range of frequencies. A low end of the first range of frequencies is less than a low end of the second range of frequencies, and a high end of the first range of frequencies is less than a high end of the second range of frequencies. In an embodiment, the first range of frequencies overlaps with the second range of frequencies.

These and other aspects, features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

The components of the following Figures are illustrated to emphasize the general principles of the present disclosure and are not necessarily drawn to scale. Reference characters designating corresponding components are repeated as necessary throughout the Figures for the sake of consistency and clarity.

DETAILED DESCRIPTION

Figure 1:
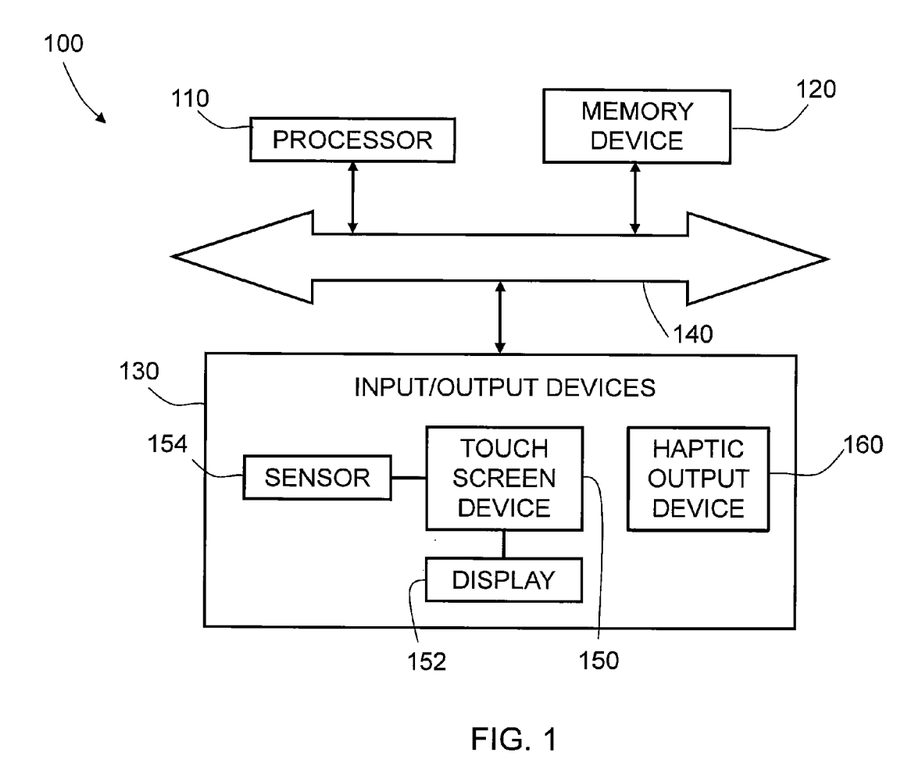
FIG. 1 is a schematic illustration of a system in accordance with embodiments of the invention.

FIG. 1 is a schematic illustration of a system 100 in accordance with an embodiment of the invention. The system 100 may be any electronic device, such as a desktop computer, laptop computer, electronic workbook, electronic handheld device (such as a mobile phone, smart phone, gaming device, personal digital assistant ("PDA"), portable e-mail device, portable Internet access device, calculator, etc.), kiosk (such as an automated teller machine, ticket purchasing machine, etc.), printer, point-of-sale device, game controller, wearable device, or other electronic device. As illustrated, the system 100 includes a processor 110, a memory device 120, and input/output devices 130, which are interconnected via a bus 140. In an embodiment, the input/output devices 130 may include a touch screen device 150, a haptic output device 160 and/or other input devices that receive input from a user of the system 100 and output devices that output information to the user of the system 100. In an embodiment, the system 100 may be a user interface that includes all of the components illustrated in FIG. 1 in a single integrated device.

In addition to the touch screen device 150 and the haptic output device 160, the input/output devices 130 may also include specific input mechanisms and output mechanisms. For example, the input mechanisms may include such devices as keyboards, keypads, cursor control devices (e.g., computer mice), other data entry devices, or an audio receiver, such as a microphone. Output mechanisms may include a computer monitor, virtual reality display device, audio output device, such as a speaker, printer, or other peripheral devices. The input/output devices 130 may include mechanisms that are designed to not only receive input from a user, but also provide feedback to the user, such as many examples of touch screen devices.

The touch screen device 150 may be configured as any suitable user interface or touch/contact surface assembly. The touch screen device 150 may be any touch screen, touch pad, touch sensitive structure, computer monitor, laptop display device, workbook display device, kiosk screen, portable electronic device screen, or other suitable touch sensitive device. The touch screen device 150 may be configured for physical interaction with a user-controlled device, such as a stylus, finger, etc. In some embodiments, the touch screen device 150 may include at least one output device and at least one input device. For example, the touch screen device 150 may include a visual display 152 configured to display, for example, images and a touch sensitive screen comprising at least one sensor 154 superimposed thereon to receive inputs from a user's finger or stylus controlled by the user. The visual display 152 may include a high definition display screen.

In various embodiments, the haptic output device 160 is configured to provide haptic feedback to the user of the system 100 while the user is in contact with a least a portion of the system 100. For example, the haptic output device 160 may provide haptic feedback to the touch screen device 150 itself to impose a haptic effect when the user is in contact with the touch screen device 150 and/or to another part of the system 100, such as a housing containing at least the input/output devices 130. As discussed in further detail below, the haptic effects may be used to enhance the user experience when interacting with the system 100.

The haptic feedback provided by the haptic output device 160 may be created with any of the methods of creating haptic effects, such as vibration, deformation, kinesthetic sensations, electrostatic or ultrasonic friction, etc. In an embodiment, the haptic output device 160 may include an actuator, for example, an electromagnetic actuator such as an Eccentric Rotating Mass ("ERM") in which an eccentric mass is moved by a motor, a Linear Resonant Actuator ("LRA") in which a mass attached to a spring is driven back and forth, or a "smart material" such as piezoelectric materials, electro-active polymers or shape memory alloys, a macro-composite fiber actuator, an electro-static actuator, an electro-tactile actuator, and/or another type of actuator that provides a physical feedback such as vibrotactile feedback. The haptic output device 160 may include non-mechanical or non-vibratory devices such as those that use electrostatic friction (ESF), ultrasonic surface friction (USF), or those that induce acoustic radiation pressure with an ultrasonic haptic transducer, or those that use a haptic substrate and a flexible or deformable surface, or those that provide thermal effects, or those that provide projected haptic output such as a puff of air using an air jet, and so on. Multiple haptic output devices 160 may be used to generate different haptic effects, as discussed in further detail below.

The processor 110 may be a general-purpose or specific-purpose processor or microcontroller for managing or controlling the operations and functions of the system 100. For example, the processor 110 may be specifically designed as an application-specific integrated circuit ("ASIC") to control output signals to the haptic output device 160 to provide haptic effects. The processor 110 may be configured to decide, based on predefined factors, what haptic effects are to be generated based on a haptic signal received or determined by the processor 110, the order in which the haptic effects are generated, and the magnitude, frequency, duration, and/or other parameters of the haptic effects. The processor 110 may also be configured to provide streaming commands that can be used to drive the haptic output device 160 for providing a particular haptic effect. In some embodiments, the processor 110 may actually include a plurality of processors, each configured to perform certain functions within the system 100. The processor 110 is described in further detail below.

The memory device 120 may include one or more internally fixed storage units, removable storage units, and/or remotely accessible storage units. The various storage units may include any combination of volatile memory and non-volatile memory. The storage units may be configured to store any combination of information, data, instructions, software code, etc. More particularly, the storage units may include haptic effect profiles, instructions for how the haptic output device 160 is to be driven, or other information for generating haptic effects.

Figure 2:
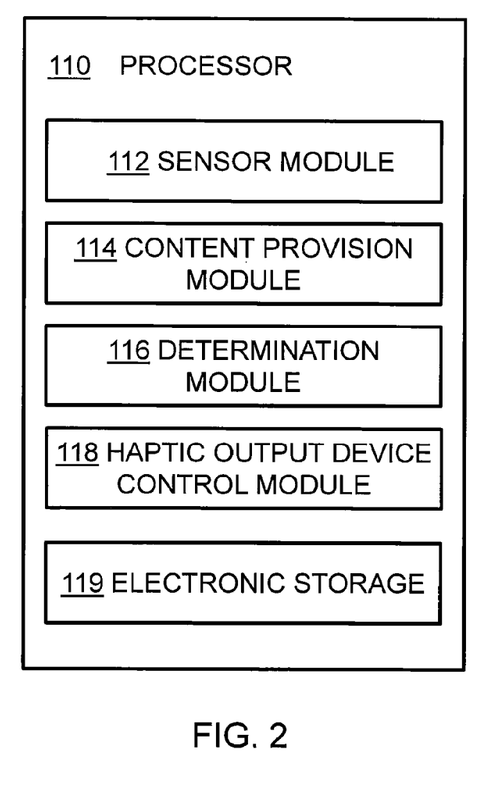
FIG. 2 is a schematic illustration of a processor of the system of FIG. 1.

FIG. 2 illustrates an embodiment of the processor 110 in more detail. The processor 110 may be configured to execute one or more computer program modules. The one or more computer program modules may include one or more of a sensor module 112, a content provision module 114, a determination module 116, a haptic output device control module 118, and/or other modules. The processor 110 may also include electronic storage 119, which may be the same as the memory device 120 or in addition to the memory device 120. The processor 110 may be configured to execute the modules 112, 114, 116, and/or 118 by software, hardware, firmware, some combination of software, hardware, and/or firmware, and/or other mechanisms for configuring processing capabilities on processor 110.

It should be appreciated that although modules 112, 114, 116, and 118 are illustrated in FIG. 2 as being co-located within a single processing unit, in embodiments in which the processor 110 includes multiple processing units, one or more of modules 112, 114, 116, and/or 118 may be located remotely from the other modules. The description of the functionality provided by the different modules 112, 114, 116, and/or 118 described below is for illustrative purposes, and is not intended to be limiting, as any of the modules 112, 114, 116, and/or 118 may provide more or less functionality than is described. For example, one or more of the modules 112, 114, 116, and/or 118 may be eliminated, and some or all of its functionality may be provided by other ones of the modules 112, 114, 116, and/or 118. As another example, the processor 110 may be configured to execute one or more additional modules that may perform some or all of the functionality attributed below to one of the modules 112, 114, 116, and/or 118.

The sensor module 112 is configured to receive an input signal from the sensor 154 that is generated when the sensor 154 detects an input from a user of the system 100. In embodiments in which there are multiple sensors, the sensor module 112 is configured to receive and process input signals from the multiple sensors. The sensor module 112 may be configured to determine whether the sensed input is an intentional input or merely an inadvertent touch to the touch screen device 150 by comparing the strength of the input signal to a predetermined threshold strength that corresponds to an intentional input. The sensor module 112 is also configured to send a signal to the determination module 116 for further processing.

The content provision module 114 is configured to control the provision of content to the user of the system 100 via the touch screen device 150. If the content includes a media file that includes computer generated images (e.g., in a videogame, virtual world, augmented reality virtual world, simulation, etc.), the content provision module 114 is configured to generate the images and/or views for display to the user through the display 152 of the touch screen device 150. If the content includes a media file that includes video and/or still images or pictures, the content provision module 114 is configured to access the video and/or still images or pictures and to generate views of the video and/or still images or pictures for display through the display 152 of the touch screen device 150. If the content to be output to the user includes graphical images, the content provision module 114 is configured to generate the images via the display 152 of the touch screen device 150. The content, or media files from which the content is derived, may be obtained by the content provision module 114 from the electronic storage 119 and/or the memory device 120.

The determination module 116 is configured to determine what was intended by the user when providing an input to the sensor 154. For example, the user may touch a certain location of the touch screen 150 or provide a particular gesture to the touch screen device 150 that indicates that a certain function is to be performed by the system 100. The determination module 116 may be programmed with a library of predetermined gestures and touch locations on the touch screen device 150 so that when the user touches a particular location on the touch screen device 150 or provides a gesture to the touch screen device 150, the determination module 116 may determine a corresponding output. For example, in an embodiment in which the system 100 is a smart phone, the user may draw a symbol on the touch screen device 150 with his or her finger and the determination module 116 may determine that the drawn symbol corresponds to a particular command, such as unlocking the smart phone so that the user may freely interact with the smart phone. In addition, the determination module 116 may also output a signal to the haptic output device control module 118 so that a haptic effect verifying the input has been detected and/or accepted may be provided to the user.

The haptic output device control module 118 is configured to receive the output signal from the determination module 16 and determine the haptic effect to be generated by the haptic output device 160, based on the signal generated by the determination module 116. Determining the haptic effect may include determining the type of haptic effect and one or more parameters of the haptic effect, such as amplitude, frequency, duration, etc., of the haptic effect that will enhance one or more aspects of the experience provided by the content to the user, as discussed in further detail below. In an embodiment, the touch screen device 150 includes a display surface, which may be rigid and configured to modulate its friction properties through, including but not limited to, electrostatic friction and ultra-sonic surface vibration, generated by a haptic output device 160, to give the user a feeling of surface relief (e.g., hills and valleys) when running a finger or stylus across the display that corresponds to the display image, as described in further detail below.

Figure 3:
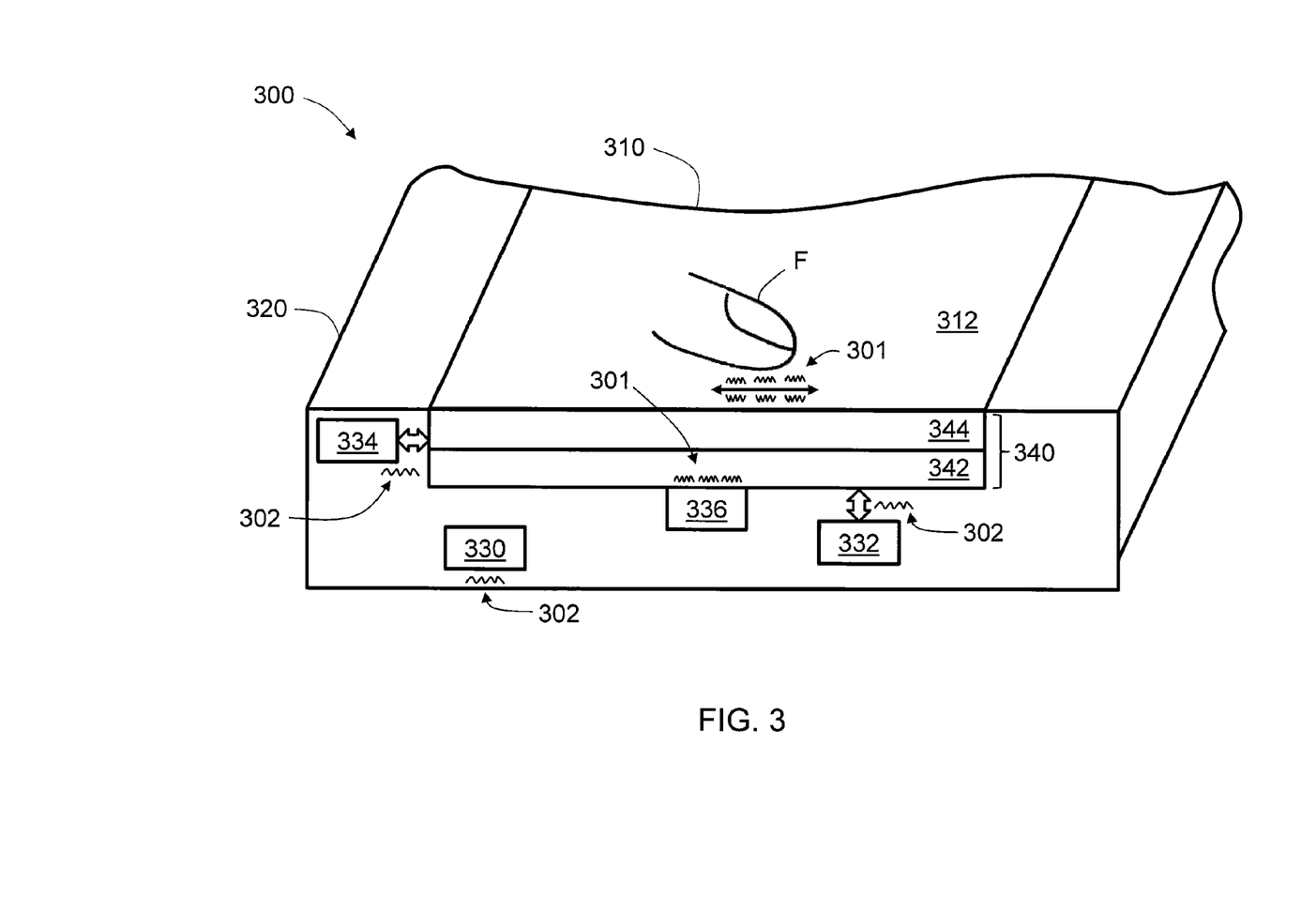
FIG. 3 is a schematic illustration of a user interface in accordance with embodiments of the invention.

FIG. 3 illustrates an embodiment of the system 100 of FIG. 1 in the form of a user interface 300 that includes a touch screen 310 and a housing 320 configured to support the touch screen 310. The user interface 300 is configured to provide a first haptic effect 301 that provides a friction effect at a surface 312 of the touch screen 310, and a second haptic effect 302 that provides vibrotactile feedback to the user of the user interface 300 through the touch screen 310 and/or the housing 320 of the user interface 300. A haptic effect refers to a stimulus or force, including but not limited to a vibration, an attractive or repulsive force, a voltage or current, some other mechanical or electromagnetic force, heating or cooling, or some other stimulus. The haptic effect may comprise one or a combination of the forces or stimuli described herein. A plurality of haptic effects may be combined to form an overall haptic effect. The haptic effect may be outputted to provide feedback to a user or object interacting with the user interface 300. The haptic effect may provide the feedback through mechanical movement, such as through vibrations of a solid object, vibrations of fluids, or actuating objects like pins or rods to touch the user. The pins or rods may deform the surface by changing the surface relief or contour. The overall haptic effect may also provide feedback through electrostatic interactions, either to generate a force on an object, like a finger F at the surface 312 of the touch screen 310, or to send an electric signal to an object that can perceive the signal, like a nerve of the finger or a sensor in a stylus held by the user.

The user interface 300 in this embodiment interfaces with the user through the touch screen 310 that is configured to sense an object that is touching the surface 312 of the touch screen 310. The object may be the user's finger F, a palm of the user's hand, or any other part of the user's body that can sense a haptic effect. The object may also be a stylus or some other device whose presence can be sensed by the touch screen 310. The touch screen 310 may sense the presence of the object through, for example, capacitive, resistive, or inductive coupling.

The user interface 300 may provide haptic effects at the surface 312 of the touch screen 310 and/or through a housing 320 of the user interface 300 through one or more haptic output devices 160 in the form of actuators 330, 332, 334, an electrostatic device 340, or through combinations thereof. The actuators 330, 332, and 334 are configured to generate mechanical motion that may translate into the second haptic effect 302 at the surface of the screen 310 and/or through the housing 320 of the user interface 300. The actuators 330, 332, 334 may be implemented as piezoelectric actuators, voice coils, magnetic actuators such as solenoids, pneumatic actuators, ultrasonic energy actuators, an eccentric mass actuator, an electroactive polymer actuator, a shape memory alloy, or some other type of actuator. The actuators 330, 332, 334 may rely on motors that convert torque into vibrations, on fluid pressure, on changes in the shape of a material, or on other forces that generate motion. Further, the actuators 330, 332, 334 are not limited to generating vibrations, but may instead generate lateral motion, up and down motion, rotational motion, or some combinations thereof, or some other motion.

In an embodiment, the actuator 330 may be a piezoelectric or a voice coil actuator that generates vibrations to generate the second haptic effect 302, the actuator 332 may be a solenoid that generates up and down motion to generate the second haptic effect 302, and the actuator 334 may be a pneumatic actuator that generates lateral motion to generate the second haptic effect 302. The actuators 330, 332, 334 may all be activated when the second haptic effect 302 is desired, or only one may be activated to conserve power or to generate different haptic effects. A particular actuator may be positioned and configured to generate the second haptic effect 302 for the entire user interface 300, for only the display screen 310 that interfaces with the user, for only a portion of the display screen, or on some other part of the user interface 300, such as the housing 320. For example, the actuator 334 may be configured to generate vibrations for only its corner of the touch screen 310 by keeping the level of vibrations low enough so that vibration amplitude outside of its corner is less than a threshold amplitude.

The user interface 300 is also configured to provide the first haptic effect 301 through the electrostatic device 340. The electrostatic device 340 may be an electrovibrotactile display or any other device that applies voltages and currents instead of mechanical motion to generate a haptic effect. The electrostatic device 340 in this embodiment has at least a conducting layer 342 and an insulating layer 344. The conducting layer 342 may be any semiconductor or other conductive material, such as copper, aluminum, gold, or silver. The insulating layer 344 may be glass, plastic, polymer, or any other insulating material. In an embodiment, the electrostatic device 340 may not have an insulating layer, so that an object can directly touch the conducting layer 342. A haptic effect may be generated by passing an electrical current from the conducting layer 342 to the object. In an embodiment, the insulating layer 344 may include one or more electrodes that can pass current to objects that touch the electrodes as the objects move across the insulating layer 344.

The user interface 300 may operate the electrostatic device 340 by applying an electric signal to the conducting layer 342. The electric signal may be an AC signal that capacitively couples the conducting layer 342 with an object near or touching the touch screen 310. The AC signal may be generated by a high-voltage amplifier. The user interface 300 may also rely on principles other than capacitive coupling to generate the first haptic effect 301. For example, in an embodiment, an ultrasonic vibration device 336 may be used to generate ultrasonic friction effects that may be felt by the user's finger at the touch surface 312.

The capacitive coupling may control a level of friction and simulate a coefficient of friction or texture on the surface 312 of the touch screen 310 to provide the first haptic effect 301. A coefficient of friction is a simulated one in that while the touch screen 310 can be smooth, the capacitive coupling may produce an attractive force between an object near the touch screen 310 and the conducting layer 342. Increasing the attractive force may increase a level of friction at the surface even when the structure of the material at the surface has not changed. Varying the levels of attraction between the object and the conducting layer 342 can vary the friction on an object moving across the touch screen 310. Varying the friction force simulates a change in the coefficient of friction. Controlling friction through a haptic effect is discussed in more detail in U.S. patent application Ser. No. 13/092,269, titled "Electro-vibrotactile Display," filed Apr. 22, 2011, and published on Oct. 25, 2012 as United States Patent Application Publication No. 2012/0268412, the entire content of which is incorporated herein by reference. The simulated coefficient of friction may be changed by the actuators 330, 332, 334 as well. For example, the actuators may increase the friction force by generating vibrations, or by changing the surface relief of the touch screen 310 to change the actual coefficient of friction.

The capacitive coupling may also generate the first haptic effect 301 by stimulating parts of the object near or touching the touch screen 310, such as mechanoreceptors in the skin of a user's finger F or components in a stylus that can respond to the coupling. The mechanoreceptors in the skin, for example, may be stimulated and sense the capacitive coupling as a vibration or some more specific sensation. For example, the conducting layer 342 can be applied with an AC voltage signal that couples with conductive parts of a user's finger F. As the user moves his or her finger F on the surface 312 of the touch screen 310, the user may sense a texture of prickliness, graininess, bumpiness, roughness, stickiness, or some other texture.

In an embodiment, the first haptic effect 301 may be generated to simulate a feature, such as a surface feature. For example, the simulated surface feature may be a spatial pattern, edge or border, or any other tactile sensation, whether natural or artificial, at the surface 312. The spatial pattern may include a grid of straight lines, a grid of concentric circles, a grid of points, a grid of tiles, any combination thereof, or any other spatial pattern. Varying the levels of attraction between the object and the conducting layer 342 can vary the friction on an object moving across the surface 312. A region having a different level of friction than surrounding regions may represent a spatial pattern component, a texture, or any other surface feature. Simulating surface features is discussed in more detail in U.S. patent application Ser. No. 13/665,526, titled "Method and Apparatus for Simulating Surface Features on a User Interface with Haptic Effects," filed Oct. 31, 2012, the entire content of which is incorporated herein by reference.

To provide the same attractive force or to provide the same level of stimuli across many different objects or persons, the electronic device 300 may also include a sensor that can measure the impedance at the surface of the touch screen 310. The sensor may measure the impedance by applying a pulse across the surface and measuring the surface voltage or by measuring the strength of the capacitive coupling. The sensor may use other known techniques for measuring impedance, and may compensate for varying ambient conditions such as the moisture in the air or temperature. The haptic effect may be adjusted based on the impedance of a person. For example, a more forceful haptic effect may be applied to an object with a higher impedance and a less forceful effect for one with lower impedance.

The user interface 300 may also include a sensor that measures the simulated coefficient of friction. This may be the same sensor as the sensor described above that measures the impedance, or it may be a different sensor. The sensor may measure the simulated coefficient based on a measured pressure that the surface 312 of the touch screen 310 is receiving, such as from an object touching the touch screen 310, and on the movement of the object at the surface 312. Movement of the object may be measured based on how the pressure at the surface 312 changes over time and over locations on the surface 312. For example, the sensor may calculate a value representing the simulated coefficient of friction based on an acceleration of a user's finger F on the touch screen 310 and on the pressure that the surface 312 receives from the user's finger F.

The haptic effects can be generated by the actuators 330, 332, 334, the electrostatic device 340, and/or the ultrasonic vibration device 336 one at a time, or can be combined. For example, a voltage may be applied to the conducting layer 342 at a level high enough to both attract the skin of a finger F touching the screen 310 and to stimulate corpuscles within the skin. Simultaneous to this electro-vibrotactile haptic effect, electrostatic forces may be produced on the conducting layer 342 and the insulating layer 344 to create mechanical motion in those layers. The haptic effects may be combined with motions generated by one or a combination of actuators 330, 332, and 334. The devices may work together to simulate the coefficient of friction or texture on the surface of the screen. The actuators may generate vibrations, for example, to also simulate changes in the surface friction or texture.

The haptic effects and the sensors may be controlled by the processer 110 described above. The processor 110 may analyze the impedance, the simulated coefficient of friction, the surface pressure, a rate of movement measured at the surface, and other factors to determine whether there has been a triggering condition for a haptic effect or how forceful a haptic effect should be.

In an embodiment of the invention, the first haptic effect 301 that includes a friction effect generated by an electrostatic device or an ultrasonic vibration device, and the second haptic effect 302 that includes a vibrotactile effect, such as vibration generated by an actuator, may be provided on distinct communication channels that may easily distinguished from one another, and may therefore communicate more information without cognitive overload or confusion to the user of the device. The first haptic effect 301 may be provided through a first communication channel and the second haptic effect 302 may be provided on a second communication channel that is different from the first communication channel. By providing the first haptic effect 301 and the second haptic effect 302 through different communication channels, the user of the user interface 300 may perceive both types of haptic effects 301, 302 and easily identify the haptic effects 301, 302 as coming from different sources.

Figure 4:
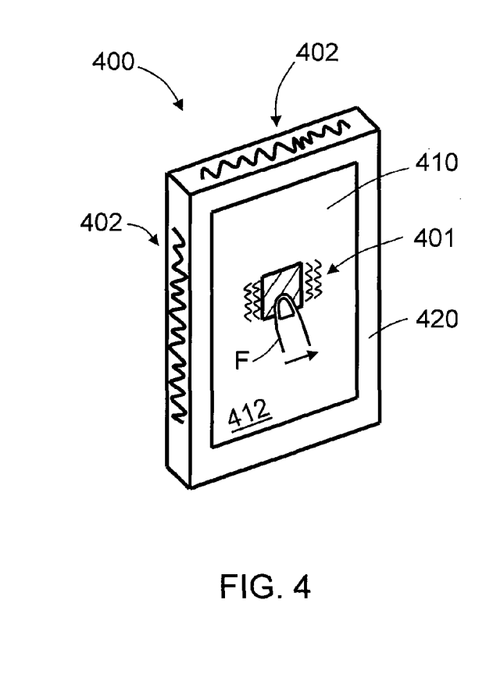
FIG. 4 schematically illustrates an implementation of the system of FIG. 1, in accordance with an embodiment of the invention.

FIG. 4 illustrates an embodiment of a user interface 400 in the form of a smart phone that includes a touch screen 410 and a housing 420 that supports the touch screen 410. The user interface 400 is configured to generate a first haptic effect 401 in the form of a friction effect on the touch screen 410 when a user's finger F or a stylus is moved across a portion of a surface 412 of the touch screen 410, as described above with respect to the embodiment illustrated in FIG. 3. The user interface 400 is also configured to produce a second haptic effect 402 in the form of vibrotactile feedback through the housing 420 of the user interface 400, as also described above. Events being displayed on the touch screen 410 or occurring as a result of interaction with the touchscreen 410 may be associated with the first haptic effect 401 and events occurring inside the housing 420, such as a notification when an e-mail, a text message, or a call is received by the smart phone, may be associated with the second haptic effect 402.

Figure 5A:
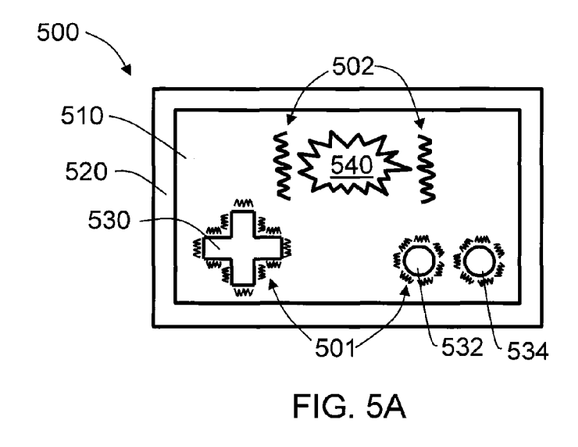
FIGS. 5A and 5B schematically illustrate implementations of the system of FIG. 1, in accordance with an embodiment of the invention.
Figure 5B:
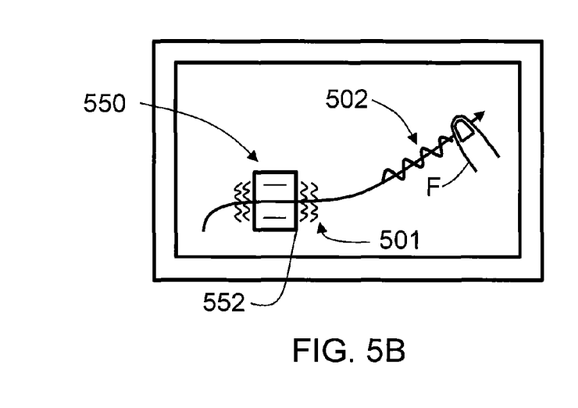

FIG. 5A illustrates an embodiment of a user interface 500 that includes a touch screen 510, a housing 520 that supports the touch screen 510, and an input device, such as a D-pad 530, a button 532 or a joystick 534, which may be displayed on the touch screen 510 or may be a physical element supported by the housing 520. The user interface 500 is configured so that a first haptic effect 501 in the form of a friction effect is generated to provide orientation cues for the user to manipulate the input device 530, 532, 534, and a second haptic effect 502 in the form of vibrotactile feedback is generated to produce game effects, such as when an explosion 540 is displayed by the touch screen 510. The two different types of effects 501, 502 may be felt as distinct and do not interfere with one another so that the effects 501, 502 may be used to provide the user with more information as compared to embodiments in which the same haptic effect being used for the orientation cues and the game effects. FIG. 5B illustrates an embodiment in which the first haptic effect 501 is used to produce effects that are related to an application being used, such as when the user's finger slides over a border 552 of an icon 550, and the second haptic effect 502 is used to provide feedback about external events, such as notifications.

In embodiments of the invention, the combination of friction effects and vibrotactile feedback may be used to support a wider range of metaphors. For example, events occurring conceptually inside the housing and on the touch screen of the user interface may be supported by vibrotactile and friction feedback, respectively. Whole-body vibrations may be felt through the housing of the user interface, while friction effects may felt through the touch screen. Such distinct haptic effects may be used to support different interaction metaphors. For example, friction effects may be used to represent the interactions between the finger and on-screen objects, or internal interactions felt through an on-screen object, such as sliding against a background image being displayed by the touch screen. Vibrotactile feedback, on the other hand, may represent internal events within the housing, such as a ball hitting the sides of the screen or a mechanism being activated within the housing.

Figure 6A:
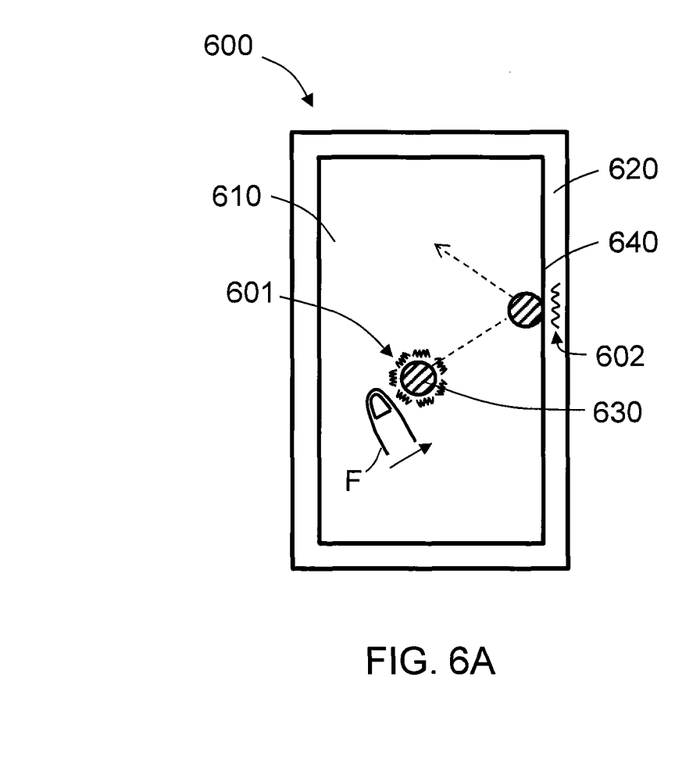
FIGS. 6A and 6B schematically illustrate implementations of the system of FIG. 1, in accordance with an embodiment of the invention.
Figure 6B:
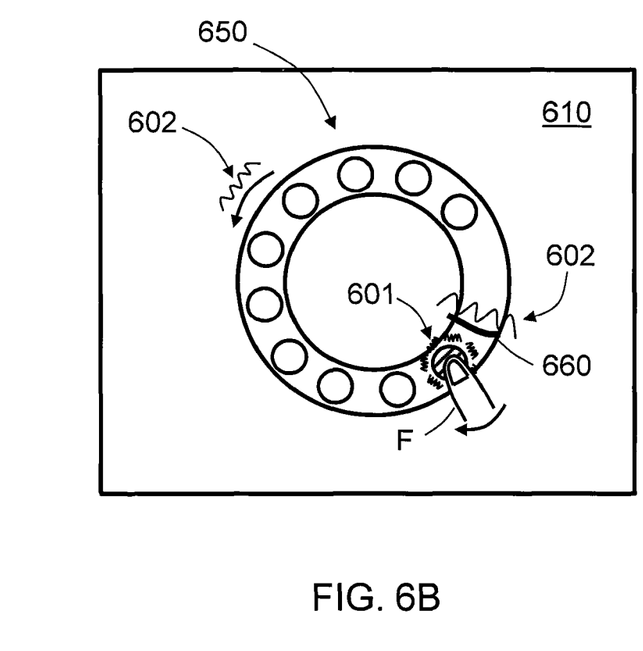

For example, FIG. 6A illustrates an implementation of a user interface 600 that includes a touch screen 610 and a housing 620 that is configured to support the touch screen 610. As illustrated, a ball 630 is displayed by the touch screen 610 and is "hit" by the user's finger F by sliding the finger F across the touch screen 610. The impact of the finger F against and the ball 630 occurs on-screen and therefore may be produced with a friction effect 601. The ball 630 moves across the touch screen 610 until it impacts a wall 640 that is located at the interface between the touch screen 610 and the housing 620. The impact of the ball 630 against the wall 640 may be felt through the housing 620 using vibrotactile feedback 602. FIG. 6B illustrates an implementation in which an image of a wheel 650 of a rotary phone is displayed by a display of the touch screen 610 and is dragged in a circular motion by the user's finger F to compose a telephone number. The friction effect 601 may be used as the wheel 650 is dragged by the user's finger F and the movement of the wheel 650 may be felt directly by the finger F. Vibrotactile feedback 602 may be used when the finger reaches a stop 660 of the rotary phone and also after the wheel 650 is released. The vibrotactile feedback 602 may felt as if holding the back of a phone.

In embodiments of the invention, the synchronization and/or combination of friction and vibrotactile effects may produce haptic effects that are richer and stronger than either effect alone. An impact, for example, may be more pronounced if produced with both types of effects. Friction and vibrotactile feedback may also be combined to create unique effects.

Figure 7A:
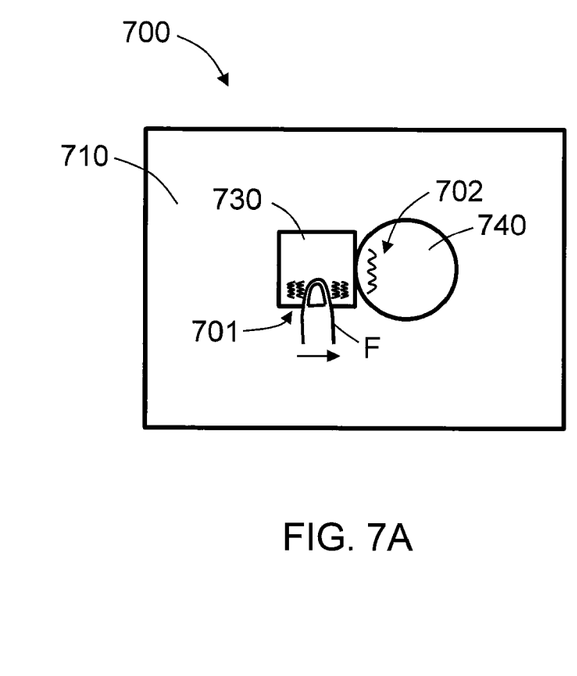
FIGS. 7A and 7B schematically illustrate implementations of the system of FIG. 1, in accordance with an embodiment of the invention.
Figure 7B:
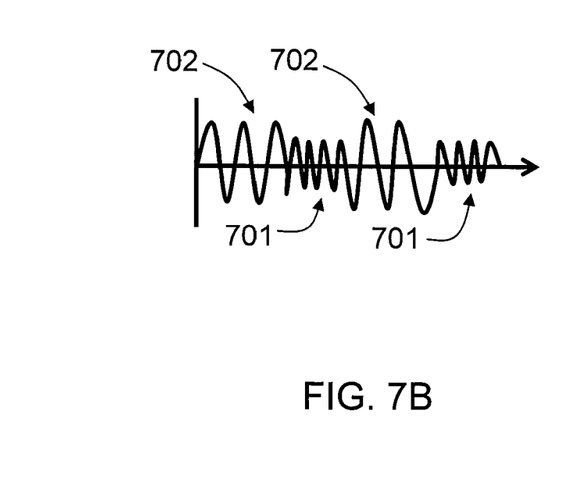

For example, FIG. 7A illustrates an implementation of a user interface 700 having a touch screen 710 in which an object 730 being displayed by the touch screen 710 is dragged against another object 740 being displayed by the touch screen 710 to create an impact. A friction effect 701, which is generated as the user's finger F moves across the touch screen 710, and vibrotactile feedback 702 may be combined to create a stronger impact effect than either effect could produce alone. FIG. 7B illustrates an implementation in which the haptic output of the device alternates between the vibrotactile feedback 702 and the friction effect 701 to create a unique sensation to the user.

In embodiments of the invention, friction and vibrotactile effects may be used to compensate for each other's limitations. A vibrotactile effect, for example, may be used to provide feedback in the absence of sliding of an object across a surface of a haptic display, which is needed to feel friction effects. Vibrotactile feedback, for example, may be used to produce feedback for tap, tap-and-hold and non-contact events. Friction effects, on the other hand, may produce continuous feedback during interactions.

Figure 8A:
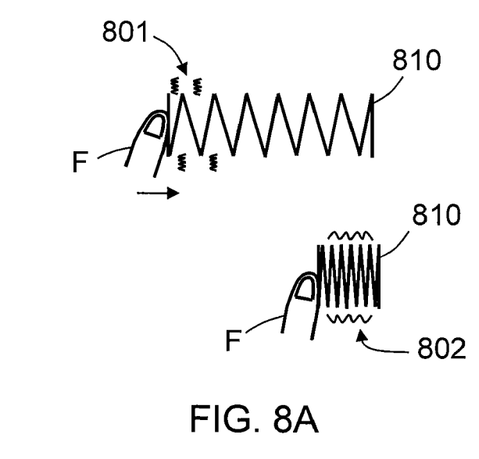
FIGS. 8A, 8B and 8C schematically illustrate implementations of the system of FIG. 1, in accordance with an embodiment of the invention.
Figure 8B:
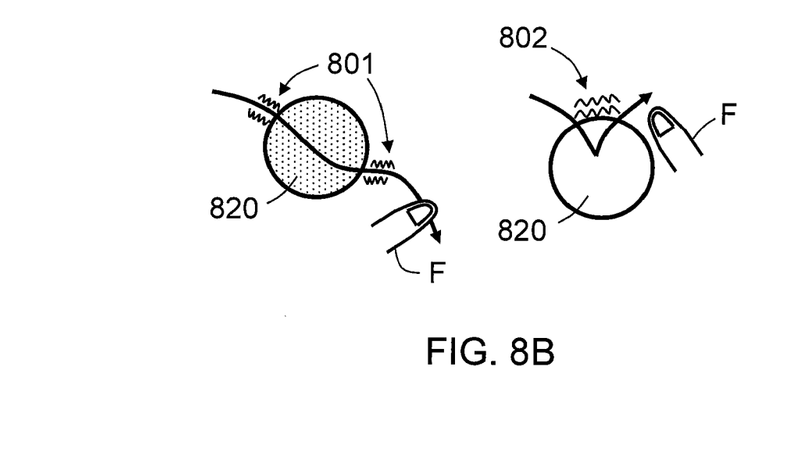
Figure 8C:
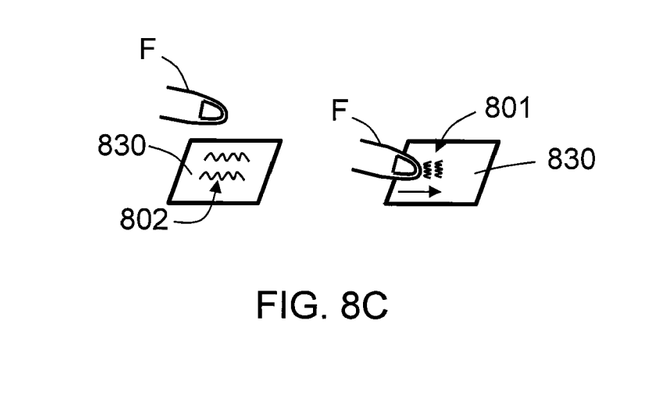

For example, FIG. 8A illustrates an implementation that simulates a spring 810 being displayed by a touch screen as the spring 810 is compressed and then held in place by the user's finger F. A friction effect 801 may be used while compressing the spring 810 since there is movement across the touch screen. Once movement stops, friction can no longer be used as the haptic effect and vibrotactile feedback 802 may be used instead to produce a tension effect. FIG. 8B illustrates an implementation in which the friction effect 801 is used to produce a texture when the user's finger is sliding against a button 820 being displayed by the touch screen, as illustrated on the left. The vibrotactile feedback 802, on the other hand, may be used to produce a click effect when the user's finger taps on the button 820, as illustrated on the right. FIG. 8C illustrates an implementation in which the vibrotactile feedback 802 is provided while the user's finger F is hovering above a surface 830 of a touch screen and the friction effect 801 is provided while touching and sliding the finger F on the surface 830 of the touch screen.

Figure 9:
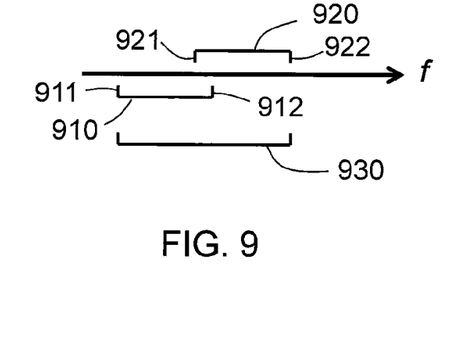
FIG. 9 schematically illustrates an implementation of the system of FIG. 1, in accordance with an embodiment of the invention.

In embodiments of the invention, friction effects and vibrotactile feedback may be combined seamlessly to extend the bandwidth of effects that can be produced, for example using friction effects for low frequencies and vibrotactile feedback for high frequencies. For example, FIG. 9 illustrates an implementation in which the range of frequencies can be extended by combining friction effects and vibrotactile effects. As illustrated, the friction effects are within a range of frequencies 910 having a low end 911 and a high end 912, and the vibrotactile effects are within a range of frequencies 920 having a low end 921 and a high end 922. The low end 911 of the range of frequencies 910 of the friction effects is less than the low end 921 of the range of frequencies 920 of the vibrotactile effects, and the high end 912 of the range of frequencies 910 of the friction effects is less than the high end 922 of the range of frequencies 920 of the vibrotactile effects. The combination of the ranges, represented by 930 in FIG. 9, provides a greater range of possible frequencies of the haptic effects that may be provided to the user. In the illustrated embodiment, the range of frequencies 910 of the friction effects overlaps the range of frequencies 920 of the vibrotactile effects. The illustrated embodiment is not intended to be limiting in any way and the ranges of frequencies 910, 920 may not overlap.

In embodiments of the invention, friction feedback may improve the perceived quality of effects produced by so-called "low definition" or "standard definition" ("SD") actuators, i.e. actuators that have a relatively slow response time, so that the effects approach high definition ("HD") quality, which are perceived by the user to be crisper. For example, SD actuators such as LRA and ERM type actuators generally have a limited frequency range when generating haptic effects. For example, an HD actuator, such as piezoelectric, electroactive polymer and electro-static based actuators, can output higher frequency content with a faster ramp-up time and larger dynamic range, which allows for richer and more lifelike effects ("HD effects") than the effects generated by SD actuators ("SD effects").

Figure 10:
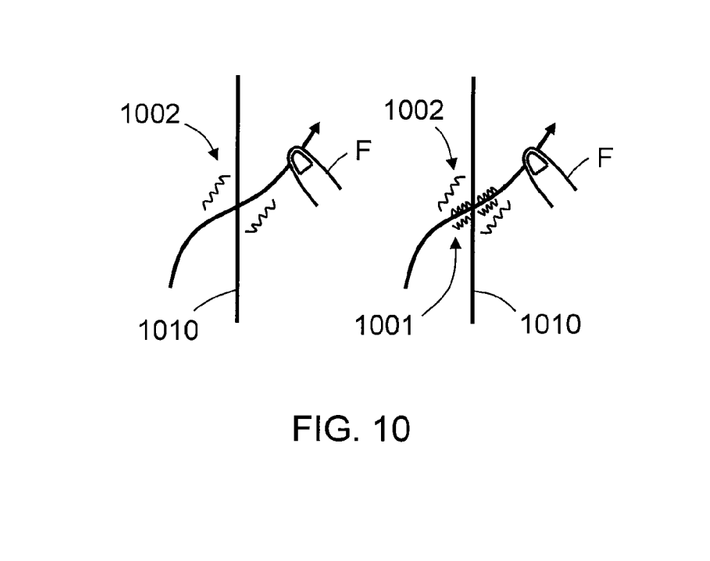
FIG. 10 schematically illustrates an implementation of the system of FIG. 1, in accordance with an embodiment of the invention.

The combination of friction effects with vibrotactile feedback in the form of vibrations may produce haptic effects resembling HD effects generated by HD actuators, perhaps at lower cost. For example, FIG. 10 illustrates an implementation in which a haptic effect is produced as a line 1010 being displayed by a touch screen is crossed by the user's finger F. On the left, the haptic effect is produced with SD vibrations 1002, which are felt as a fuzzy buzz by the user of the user interface. On the right, the haptic effect is produced with the same SD vibrations 1002, as well as a more complex friction effect 1001. The resulting haptic effect is still felt as a vibration, but the sensation may be richer and closer in quality to a HD vibration, because the friction effect 1001 may fill in for the less responsive SD actuator producing the SD vibrations 1002.

Figure 11:
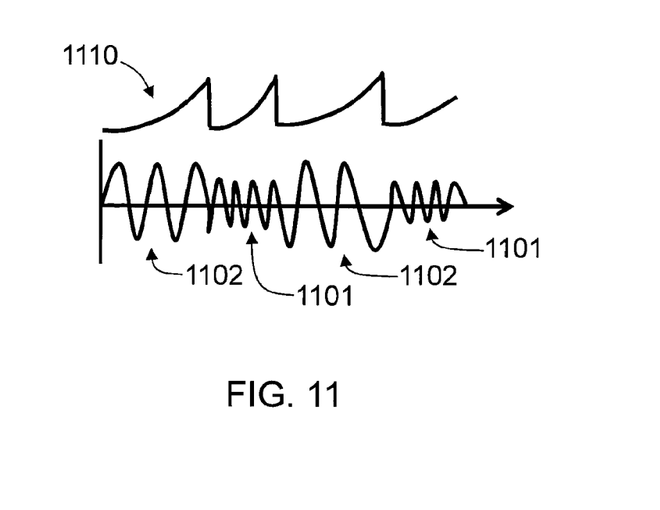
FIG. 11 schematically illustrates an implementation of the system of FIG. 1, in accordance with an embodiment of the invention.

It has been found that the sense of touch may adapt to certain stimuli over time and become less sensitive. In an embodiment, the haptic effects provided to the user may alternate between friction effects and vibrotactile effects to help combat adaptation. Alternating between friction and vibrotactile effects may provide a lessening of the sensitivity to tactile stimuli over time. For example, a haptic effect provided by vibrotactile feedback may be switched to a friction effect after a predetermined amount of time to avoid adaptation. FIG. 11 illustrates an implementation in which the output of the haptic output device 160 switches between a vibrotactile effect 1102 and a friction effect 1101 based on a model of tactile adaptation, represented by 1110. The model of tactile adaptation 1110 may be stored in the determination module 116 or the haptic output device control module 118 described above. Whenever the user's finger is believed to be numb to the current type of haptic effect, the haptic output device 160 may generate the other type of haptic effect, ideally in a manner that produces a very similar sensation. The transition may be gradual to make the switch between the two different types of haptic effects feel smooth to the user.

Embodiments of the invention take advantage of the combination of friction and vibrotactile technologies, which make the combination more engaging than either technology alone. The haptic output devices described above may be completely independent or may share some components, such as microcontrollers and driving circuitry. The haptic displays may also be controlled independently, or as a combination by a smart controller. Embodiments of the invention may allow developers to specify an intended effect (e.g., vibration at a certain frequency) and let the controller determine whether a haptic output device that generates friction or a haptic output device that generates vibrotactile feedback should be activated.

The embodiments described herein represent a number of possible implementations and examples and are not intended to necessarily limit the present disclosure to any specific embodiments. Instead, various modifications can be made to these embodiments as would be understood by one of ordinary skill in the art. Any such modifications are intended to be included within the spirit and scope of the present disclosure and protected by the following claims.

What is claimed is:

1. A system for reducing adaptation to a haptic effect, the system comprising:
a sensor configured to sense an input received at a surface;
a first haptic output device configured to generate a first type of haptic feedback;
a second haptic output device configured to generate a second type of haptic feedback that is different than the first type of haptic feedback;
a processor in communication with the sensor, the first haptic output device, and the second haptic output device; and
a memory on which instructions executable by the processor are stored to cause the processor to:
determine that the haptic effect is to be output for a duration in response to the input, the haptic effect being the first type of haptic feedback;
cause the first haptic output device to output the haptic effect for a time period that is less than the duration; and
in response to the time period exceeding a predetermined amount of time associated with adapting to the haptic effect, cause the second haptic output device to output the second type of haptic feedback during the duration.

2. The system according to claim 1, wherein the first haptic output device comprises an electrostatic device.

3. The system according to claim 1, wherein the first haptic output device comprises an ultrasonic vibration device.

4. The system according to claim 1, wherein the second haptic output device comprises an actuator.

5. The system according to claim 4, wherein the actuator comprises a piezoelectric actuator, a voice coil, a magnetic actuator, a pneumatic actuator, an ultrasonic energy actuator, an eccentric mass actuator, an electroactive polymer actuator, or a shape memory alloy.

6. The system according to claim 1, further comprising a touch screen comprising the surface.

7. The system according to claim 6, wherein the touch screen comprises a display configured to display an image.

8. The system according to claim 7, wherein the haptic effect is associated with the image being displayed by the display and a second haptic effect that is not associated with the image being displayed by the display is output.

9. The system according to claim 1, wherein the haptic effect is output in response to a notification.

10. The system according to claim 7, wherein the haptic effect is associated with movement of the image by the user.

11. The system according to claim 7, wherein the haptic effect is associated with an interaction of the image displayed by the display with an edge of the display.

12. The system according to claim 7, wherein the haptic effect is associated with movement of the image without interaction by the user.

13. The system according to claim 7, wherein the haptic effect is associated with an interaction of the image displayed by the display with a second image displayed by the display.

14. The system according to claim 7, wherein the haptic effect is associated with alteration of the image from a first shape to a second shape, and wherein a second haptic effect is output in response to the image being held in the second shape.

15. The system according to claim 7, wherein the haptic effect is generated in response to a user interaction with the image comprising sliding a body part across the surface at a location of the image.

16. The system according to claim 1, wherein the memory further includes instructions executable by the processor to cause the processor to cause the first type of haptic feedback and the second type of haptic feedback to be output at the same time.

17. The system according to claim 1, wherein the second type of haptic feedback is output after the first type of haptic feedback and for a remainder of the duration.

18. The system according to claim 1, wherein the haptic effect is generated in response to the user hovering a body part over, and at a distance from, the surface.

19. The system according to claim 1, wherein the memory further includes instructions to cause the processor to:
cause the first haptic output device to output the first type of haptic feedback by transmitting a first drive signal that comprises a first frequency in a first range of frequencies to the first haptic output device; and
cause the second haptic output device to output the second type of haptic feedback by transmitting a second drive signal that comprises a second frequency in a second range of frequencies to the second haptic output device, wherein a low end of the first range of frequencies is less than a low end of the second range of frequencies, and a high end of the first range of frequencies is less than a high end of the second range of frequencies.

20. The system according to claim 19, wherein the first range of frequencies overlaps with the second range of frequencies.

21. The system of claim 1, wherein the first type of haptic feedback is a friction effect and the second type of haptic feedback is a vibrotactile effect, or the first type of haptic feedback is the vibrotactile effect and the second type of haptic feedback is the friction effect.

22. The system of claim 1, wherein the memory further includes instructions that are executable by the processor to cause the processor to:
  determine that the first type of haptic feedback and the second type of haptic feedback should be alternatively output, during the duration, according to a predetermined sequence.

23. A method for reducing adaptation to a haptic effect, the method comprising:
  determining that the haptic effect is to be output for a duration in response to an input, the haptic effect being a first type of haptic feedback;
  causing a first haptic output device to output the haptic effect for a time period that is less than the duration; and
  in response to the time period exceeding a predetermined amount of time associated with adapting to the haptic effect, causing a second haptic output device to output a second type of haptic feedback during the duration, the second type of haptic feedback being different from the first type of haptic feedback.

24. The method according to claim 23, further comprising displaying an image through a touch surface.

25. The method according to claim 24, wherein the haptic effect is associated with the image being displayed, and wherein a second haptic effect that is not associated with the image being displayed is output.

26. The method according to claim 23, wherein the haptic effect is output in response to a notification and independent of a user interaction.

27. The method according to claim 23, wherein the haptic effect is associated with movement of the image by the user.

28. The method according to claim 24, wherein the haptic effect is associated with an interaction of the image displayed by the display with an edge of the display.

29. The method according to claim 24, wherein the haptic effect is associated with movement of the image without interaction by the user.

30. The method according to claim 24, further comprising displaying a second image at the same time the image is being displayed, wherein the haptic effect is associated with an interaction of the image being displayed with the second image being displayed.

31. The method according to claim 24, wherein the haptic effect is associated with alteration of the image from a first shape to a second shape, and wherein a second haptic effect is output in response to the image being held in the second shape.

32. The method according to claim 24, wherein the haptic effect is generated in response to a user interaction with the image comprising sliding a body part across the surface at a location of the image.

33. The method according to claim 23, further comprising causing first type of haptic feedback and the second type of haptic feedback to be output at the same time.

34. The method according to claim 23, wherein the second type of haptic feedback is output after the first type of haptic feedback and for a remainder of the duration.

35. The method according to claim 24, wherein the haptic effect is generated in response to the user hovering a body part over, and at a distance from, the touch surface.

36. The method according to claim 23, further comprising:
  causing the first haptic output device to output the first type of haptic feedback by transmitting a first drive signal comprising a first frequency in a first range of frequencies to the first haptic output device; and
  causing the second haptic output device to output the second type of haptic feedback by transmitting a second drive signal comprising a second frequency in a second range of frequencies to the second haptic output device,
  wherein a low end of the first range of frequencies is less than a low end of the second range of frequencies, and a high end of the first range of frequencies is less than a high end of the second range of frequencies.

37. The method according to claim 36, wherein the first range of frequencies overlaps with the second range of frequencies.

* * * * *